(12) United States Patent
Wong et al.

(10) Patent No.: US 6,696,922 B1
(45) Date of Patent: Feb. 24, 2004

(54) INTERACTIVE PAGER DOCKING SYSTEM

(75) Inventors: Cheng Cheong Gilbert Wong, Mississauga (CA); Guy Griffith, Mississauga (CA)

(73) Assignee: 1229937 Ontario Limited, Toronto (CA)

( * ) Notice: Subject to any disclaimer, the term of this patent is extended or adjusted under 35 U.S.C. 154(b) by 0 days.

(21) Appl. No.: 09/376,312

(22) Filed: Aug. 18, 1999

(51) Int. Cl.[7] .................. H04Q 1/30; H04Q 7/00; H02J 7/00
(52) U.S. Cl. .............. 340/7.32; 340/7.1; 340/7.4; 320/114; 320/115
(58) Field of Search ............... 340/7.32, 7.1, 340/7.4, 7.63; 320/114, 115, 116

(56) References Cited

U.S. PATENT DOCUMENTS

| | | | |
|---|---|---|---|
| 5,510,778 A | | 4/1996 | Krieter et al. |
| 5,515,285 A | | 5/1996 | Garrett, Sr. et al. |
| 5,519,403 A | | 5/1996 | Bickley et al. |
| 5,661,652 A | | 8/1997 | Sprague et al. |
| 5,739,665 A | * | 4/1998 | Bares ..................... 320/115 |
| 5,786,789 A | | 7/1998 | Janky |
| 5,940,767 A | * | 8/1999 | Bourgeois et al. ........... 455/466 |
| 6,184,654 B1 | * | 2/2001 | Bachner et al. ............. 320/114 |
| 6,202,008 B1 | * | 3/2001 | Beckert et al. ........ 340/825.24 |
| 6,278,442 B1 | * | 8/2001 | Griffin et al. ............... 345/169 |
| 6,326,767 B1 | * | 12/2001 | Small et al. ................. 320/116 |
| 6,337,975 B1 | * | 1/2002 | Coan et al. .................. 455/129 |

OTHER PUBLICATIONS

"Research in Motion Delivers Wearable Wireless Device Based on Embedded Intel Architecture." BlackBerry 1999 Press Releases, Jan. 19, 1999, Research in Motion Limited. Apr. 15, 2003 <http://www.balckberry.com/news/press/1999/pr–19_01_100–02.s*

* cited by examiner

Primary Examiner—Brian Zimmerman
Assistant Examiner—Clara Yang
(74) Attorney, Agent, or Firm—Marks & Clerk (57) ABSTRACT

An interactive pager docking system includes a docking cradle which is powered by a rechargeable battery, and includes a battery charger module which monitors the status of the battery and recharges it if necessary. It also includes a plurality of external serial ports and a serial port multiplexer, so that a number of different external peripheral devices may be connected to it. A GPS receiver communicates with the pager, so that an automatic vehicle location system may be operated employing the pager. A satellite transceiver may be connected to the docking cradle, together with an external printer, bar code scanner, and/or alarm annunciator. The docking cradle is adapted to be powered by a vehicle battery, but turns off the GPS receiver after a predetermined period of time so as not to run down the vehicle battery if the pager is not in place in the docking cradle.

18 Claims, 4 Drawing Sheets

INTERACTIVE PAGER DOCKING SYSTEM

FIELD OF THE INVENTION

This invention relates to a docking system for an interactive pager, which docking system is, itself, interactive. In particular, the present invention is directed towards an interactive pager docking system which provides a docking cradle for an interactive two-way packet data pager. In certain embodiments of the present invention, the interactive pager docking system will also include a GPS (Global Positioning System) receiver. The interactive pager docking system of the present invention permits communication between an interactive two-way packet data pager and a plurality of peripheral devices. As such, the interactive pager docking system of the present invention provides messaging, communication, and present location capabilities, especially when equipped with satellite communication and GPS peripherals. The present invention is applicable in certain AVL (Automatic Vehicle Location) applications.

BACKGROUND OF THE INVENTION

Interactive two-way packet data pagers are becoming more common. In essence, the interactive two-way packet data pager can be characterized as a two-way wireless radio communicator having a microprocessor, or a microprocessor having a two-way wireless communication module. In any event, an interactive two-way packet data pager is capable of executing programmed applications, which may be built in or may be user programmed or input from a keyboard which forms an integral part of the interactive two-way packet data pager. Moreover, any interactive two-way packet data pager is capable of sending, receiving, and displaying alphanumeric data.

However, the present invention provides greatly increased functionality for a two-way packet data pager by enabling the interactive two-way packet data pager to function in association with other passive or interactive peripheral equipment such as a satellite communications module, a GPS receiver, printers, bar code readers, and the like. These additional peripheral devices provide additional functionality to the interactive two-way packet data pager, such as by permitting it to determine the present geographic location of the interactive pager docking system through the GPS receiver; or such as to permit the pager to transmit alphanumeric data to a home station even if the pager is out of its packet data network by communicating through a satellite transceiver.

Ordinarily, an interactive two-way packet data pager is equipped with a single serial port for communication with such as a printer. However, in keeping with a provision of the present invention, when the interactive two-way packet data pager is inserted into and held in place in a docking cradle provided therefor, the additional peripheral equipment for the pager is associated therewith through the cradle. Moreover, the docking cradle provides communication port multiplexing, so that additional serial port functionality for the interactive two-way packet data pager is provided.

By providing a serial port multiplexer, it is possible to allow communication from and to the pager and, in any event, from and to the interactive pager docking system, through a peripheral satellite communications transceiver. Still further, the GPS receiver may be connected to the docking cradle either through the serial multiplexer, or through a dedicated communications port.

One feature of the present invention is that, while the interactive two-way packet data pager is secured in its docking cradle, the pager will be able to scan various cradle ports for data, and it will be able to send data or commands to the various peripherals which are connected to the docking cradle.

For example, the interactive two-way packet data pager, through its microprocessor and internal memory, may be programmed to periodically poll the GPS receiver for the present position of the interactive pager docking system. As will be discussed hereafter, this is particularly useful in circumstances when the interactive pager docking system of the present invention is installed in a vehicle. By so doing, a remote dispatch station or AVL centre may be advised of the present location of a vehicle, from which it may also determine the speed and direction in which the vehicle is moving. Indeed, if the pager detects that it is out of range of the packet data network with which it would normally communicate, the interactive pager docking system will re-route messages to and from the pager, and from the GPS receiver, through the peripheral satellite transceiver. Sufficient memory is provided in the pager so that, if necessary, messages to and from the pager to the satellite transceiver may be cued until they are received by or transmitted from the two-way interactive pager.

A further, very important, feature of the present invention is that the docking cradle includes a battery charger module for charging a rechargeable battery with which the interactive two-way packet data pager is provided. The battery charger module is under the control of charging programs and protocols, so that charging of the rechargeable battery will only be initiated, continue, or be terminated, in keeping with predetermined parameters and conditions.

Still further, as will be described in greater detail hereafter, especially when the interactive pager docking system of the present invention is installed in a vehicle, and includes a GPS receiver, if a pager is not in the cradle then power to the GPS receiver - which is being delivered through the cradle from the vehicle battery to the GPS receiver - will be terminated after a predetermined period of time.

Needless to say, the interactive pager docking system of the present invention is such that it will be functional with any interactive two-way packet data pager which is adapted to be fitted into the docking cradle, irrespective of the communication protocols according to which the two-way interactive pager operates. Thus, the interactive pager docking system of the present invention can operate with interactive two-way packet data pagers in virtually any country of the world.

Since the interactive pager docking system of the present invention is primarily, but not exclusively, intended for operation in a mobile vehicle environment, other peripherals which may comprise part of the interactive pager docking system may include high decibel beepers, high brightness lamps, and so on, to catch the attention of a driver or occupant of a vehicle, even in the noisy or otherwise busy environment of a moving vehicle.

Accordingly, the present invention provides a rugged mobile data terminal which may be effectively used in vehicles, at very low costs compared with, say, laptop computers having special communications facilities. However, an ordinary laptop computer would not provide the two-way interactive pager functionality that a pager does. Effectively, an interactive two-way packet data pager is a low cost device providing a built-in packet data modem, a back-lit display, and a "QWERTY" keyboard, in a package which is generally no larger than an ordinary pager. Such devices are generally adapted to operate on one AA battery; and, in keeping with the provisions of the present invention, that battery will be a rechargeable battery. Typically, rechargeable batteries are nickel cadmium (NiCd), nickel metal hydride (NiMH), or rechargeable alkaline. It is also possible that such interactive two-way packet data pagers as are particularly contemplated herein may also include a lithium battery.

By providing the interactive pager docking system of the present invention, many different commercial, quasi-Governmental, and Governmental operations are enabled with low cost data communications for local dispatch or vehicle location purposes. For example, fleet operators having cars or trucks which may operate very widely geographically may equip each vehicle with an interactive pager docking system in keeping with the present invention, whereby the vehicle will always be in packet data communication for sending and receiving messages to and from a central dispatch office; as well as being provided with a GPS system so that the central dispatch office may determine at any time upon query, or periodically as may be programmed, exactly where any particular vehicle is located. Other typical operations may include the dispatching and positioning of vehicles in an airport operation; or in a theatre of war under war games conditions, or in hostilities.

The fact that the docking cradle has the ability to connect a plurality of serial devices to the interactive two-way packet data pager, allows for wide area satellite communications, as well as working with a packet data network, along with automatic vehicle location. Moreover, operation of peripheral devices such as a printer or bar code scanner is provided for, under the operation and control of application programs which may be programmed into the interactive pager by way of its microprocessor and/or memory. Thus, the pager, with respect to a vehicle, is both portable and tethered, at low cost especially when compared with the use of such as a laptop computer.

The interactive pager docking system provides, however, for the fact that the pager is not necessarily tethered to a vehicle at any time, and can be removed from the docking cradle so as to follow the operator of the vehicle when he is outside the vehicle. That operator will still have packet data communication available to him to conduct two-way data messaging if he is in communication with the packet data network.

Moreover, when the pager is inserted into the docking cradle, it is thereby tethered to the vehicle for all purposes of communication and AVL.

DISCUSSION OF THE PRIOR ART

KRIETER et al. U.S. Pat. No. 5,510,778, issued Apr. 23, 1996, discloses a pager receiving system whose purpose is to be integrated as one function of a multi-function electronic card device for insertion into a portable computing device—a laptop computer, for example. A frequency agile receiver includes a frequency synthesizer for generating a user selectable down conversion frequency that it combined by a mixer to produce a received paging signal at a predetermined intermediate frequency. A driver-less interface multiplexes the received paging signal with the output of a data modem so that the computing device requires only a driver interface for the data modem in order to receive both modem data and paging information. Paging information which is received from the computing device is stored in a format that is determined by the platform of the particular computing device into which the electronic card device has been inserted. A pager receiving caddy is also provided, which can receive the electronic card device when it is not inserted into the laptop computer, so that the electronic card device can continue to receive paging information.

GARRETT, Sr. et al. U.S. Pat. No. 5,515,285 issued May 7, 1996 teaches a system for monitoring vehicles during a crisis situation. The tracking system which is taught assumes, for example, that a crisis situation might be such as a carjacking. Each vehicle to be monitored includes an on-board apparatus which reports the location of the vehicle during the crisis situation. Communication is automatically initiated with a remote monitoring facility via a cellular telephone network; and, using selected status information, real-time tracking of the vehicle may be initiated. Peripheral devices, including a siren, a strobe lamp, or a circuit to turn off the ignition of the vehicle ignition, may be provided.

BICKLEY et al. U.S. Pat. No. 5,519,403 issued May 21, 1996 teaches a Global Positioning System including a GPS receiver for generating position information, a processor coupled to the GPS receiver by a bus, and a communications multi-interface coupled by the bus to both the GPS receiver and to the processor. The processor presents position information to the communications multi-interface, which is capable of interfacing with a wide variety of communications systems. Among the various purposes for which the GPS communications multi-interface described in the Bickley et al. patent, there are included location reporting pager systems, as well as cellular telephone location systems, remote locator/responder systems, beacon locator systems, and the like.

SPRAGUE et al. U.S. Pat. No. 5,661,652 issued Aug. 26, 1997 teaches a mobile network having automatic position reporting between various units in the network, and comprises a plurality of GPS navigation receivers, each having two-way radio data communication for communicating the current computed positions of the individual mobile units to other mobile units in the network, and also to a stationary dispatch controller. Ordinarily, the stationary dispatch controller is connected in by a public switched telephone network. Thus, ordinary telephone personal pager service may be carried out transparently in the network for mobile units that are not equipped with a GPS receiver. The mobile network finds particular utility in such applications as determining the presence at all times of police and/or fire vehicles, as well as such items as parcel pick-up and delivery vehicles, taxis, and the like.

JANKY U.S. Pat. No. 5,786,789 teaches a GPS unit and a cellular telephone unit each having add-on modules for providing additional functionality. A battery powered handheld GPS unit has a battery module with a built-in cellular telephone. The controls on the GPS are used to control cellular telephone operations, so that the GPS controlled cellular telephone will transmit position location information obtained by the GPS unit. Alternatively, a battery powered hand-held cellular telephone unit may also be equipped with a battery power module having a built-in GPS device; in which case, the controls on the cellular telephone are used to control the GPS device operations. Thus, and in any event, the cellular telephone portion will be able to transmit position location information obtained by the GPS device.

SUMMARY OF THE INVENTION

In accordance with one aspect of the present invention, there is provided an interactive pager docking system for a pager, where the system comprises an interactive two-way packet data pager and a docking cradle therefor. The interactive two-way packet data pager is a two-way wireless radio communicator having a microprocessor, and is capable of executing a programmed application, and also being capable of sending, receiving, sharing and displaying alphanumeric data. The interactive two-way packet data pager is powered by a rechargeable battery, and has a pair of externally connectible terminals for delivering charging power to the rechargeable battery.

Moreover, the interactive two-way pager has a radio modem for sending and receiving alphanumeric data in packet data format, and has a communication port for sending and receiving alphanumeric data and control signals to and from the docking cradle.

The docking cradle is adapted to physically hold the pager in place, when the pager is inserted into the docking cradle. The docking cradle has a pair of charging terminals for connecting to the externally connectible terminals of the pager, when the pager is being physically held in place in the docking cradle.

The docking cradle has a docking communications port for connecting to the communications port of the pager, when the pager is being physically held in place in the docking cradle.

The docking cradle is connectible to a source of power, and is adapted to provide charging power to the rechargeable battery in the pager under the control of a battery charger module in the docking cradle, when the pager is being physically held in place in the docking cradle. Moreover, the docking cradle includes a communications multiplexer in series with the communication port of the docking cradle, and at least two further external communications ports in series with the multiplexer for connection to external peripheral devices capable of exchanging data and control signals with the docking cradle and the pager through the further communications port.

The communications ports in the pager and in the docking cradle may be RS-232, USB, or Ethernet ports.

Typically, the communication ports of the pager and the docking cradle are RS-232 ports. Moreover, the interactive pager docking system of the present invention may further comprise a GPS receiver in communication with the docking cradle through a communications port provided in the docking cradle therefor.

In that case, the GPS receiver may communicate with the docking cradle through one of at least two further communications ports which are in series with the multiplexer. Alternatively, the GPS receiver may communicate with the docking cradle through a dedicated RS-232 port provided therefor.

In a usual, but not exclusive, embodiment of the present invention, the docking cradle is adapted to be connected to a source of 12 volts DC power so that it may be mounted in a vehicle.

The physical structure of the docking cradle is such that it will include spring means so as to provide a spring resistance against which the pager is physically held in place, and thereby so as to maintain a shock-proof and vibration-proof connection between the externally connectible terminals of the pager and the pair of charger terminals of the docking cradle, and also between the communications port of the pager and the docking communications port of the docking cradle.

External devices to which the docking cradle of the interactive pager docking system of the present invention may be connected, may include any of a GPS receiver, a satellite transceiver, a printer, a bar code scanner, an alarm annunciator, or combinations thereof.

The interactive two-way packet data pager has a "QWERTY" keyboard for inputting alphanumeric data— and instructions—to the pager.

Particularly when the communications ports of the pager and the docking cradle are RS-232 ports, one of the further external communications ports in the docking cradle may be connected to a satellite transceiver. Thus, data may be sent from and received by the pager through the docking cradle.

Moreover, data and control signal translation modules may be included in the docking cradle so as to provide translation between and among the pager and the external peripheral devices that are connected to the docking cradle through the communications ports.

The pair of charger terminals in the docking cradle may be physically located with the docking communications port. If so, there are at least two communications terminals provided for purposes of sending and receiving data and control signals to and from the pager. However, one of the pair of charger terminals and one of the at least two communications terminals, may be a common terminal.

Sensing means may be provided in the docking cradle so as to determine the presence of a pager in the docking cradle. Also, the docking cradle may include a power module to provide power to the GPS receiver. If so, the power module may further include a timer which acts to shut off power to the GPS receiver when the sensing means senses that the pager has not been in the docking cradle for a predetermine period of time.

Particularly when the docking cradle of the interactive pager docking system of the present invention is adapted to be connected to a source of 12 volts DC power, so that it is mounted in a vehicle, the interactive pager docking system may further comprise a GPS receiver in communication with the docking cradle through a communications port provided therefor. Sensing means are provided to determine the presence of the pager in the docking cradle and, as noted above, the docking cradle may include a power module to provide power to the GPS receiver. If so, and when the power module further includes a timer which acts to shut off power to the GPS receiver when the sensing means senses that the pager has not been in the docking cradle for a predetermined period of time, then after that predetermined period of time, power will not be drawn from a vehicle battery to which the interactive pager docking system has been connected.

The battery charger module in the docking cradle of the present invention may be adapted to detect the terminal voltage of the rechargeable battery in the pager, so as to initiate a charging operation when predetermined terminal voltage conditions of the rechargeable battery exist. Moreover, the battery charger module may further include temperature sensing means to determine the internal temperature of the rechargeable battery, and to discontinue the charging operation when predetermined internal temperature conditions of the rechargeable battery exist.

Indeed, as will also be noted hereafter, the battery charger module may include temperature sensing means which may also function to determine the ambient temperature in which the interactive pager docking system is operating, so that a charging operating may be precluded or terminated if ambient temperature conditions outside predetermined ambient temperature conditions exist.

Still further, the charging operation may be discontinued after a predetermined period of time, also in keeping with instructions from timer means in the battery charger module.

The docking cradle may include lamp means for indicating the status of a charging operation, under the control of the battery charger module. Those lamp means may also function to indicate the presence of incoming data to the pager, under the control of the microprocessor in the pager.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
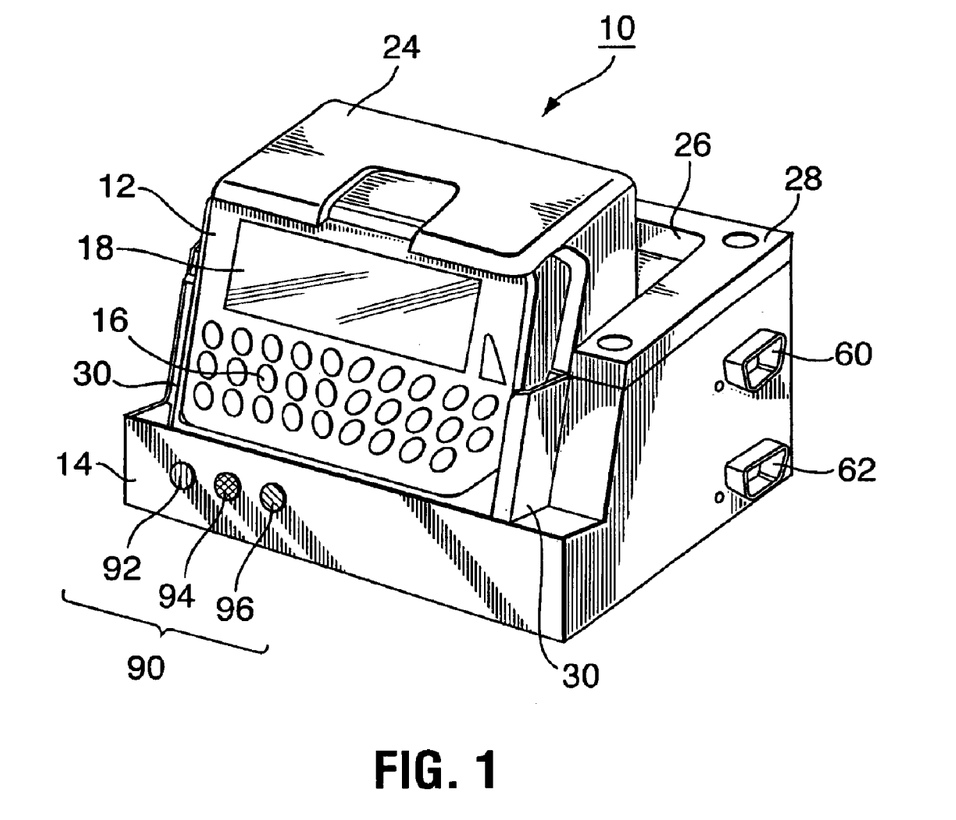
FIG. 1 is a generalized perspective view of an interactive pager docking system in keeping with the present invention, showing a docking cradle having an interactive two-way packet data pager being held in place therein.
Figure 2:
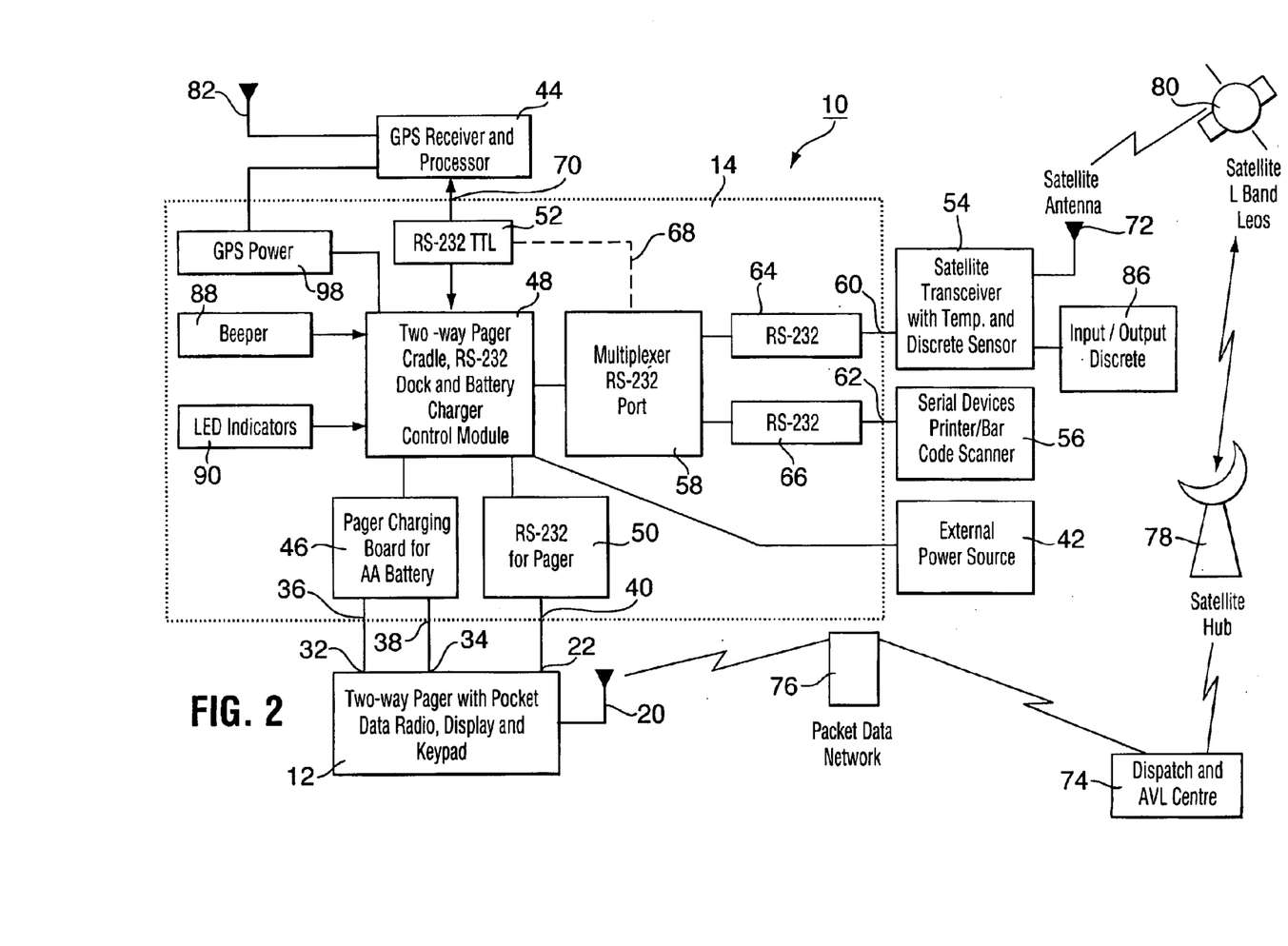
FIG. 2 is a block schematic diagram showing the principal operating modules of an interactive pager docking system in keeping with the present invention, together with its peripheral equipment, in a typical operating environment.
Figure 3:
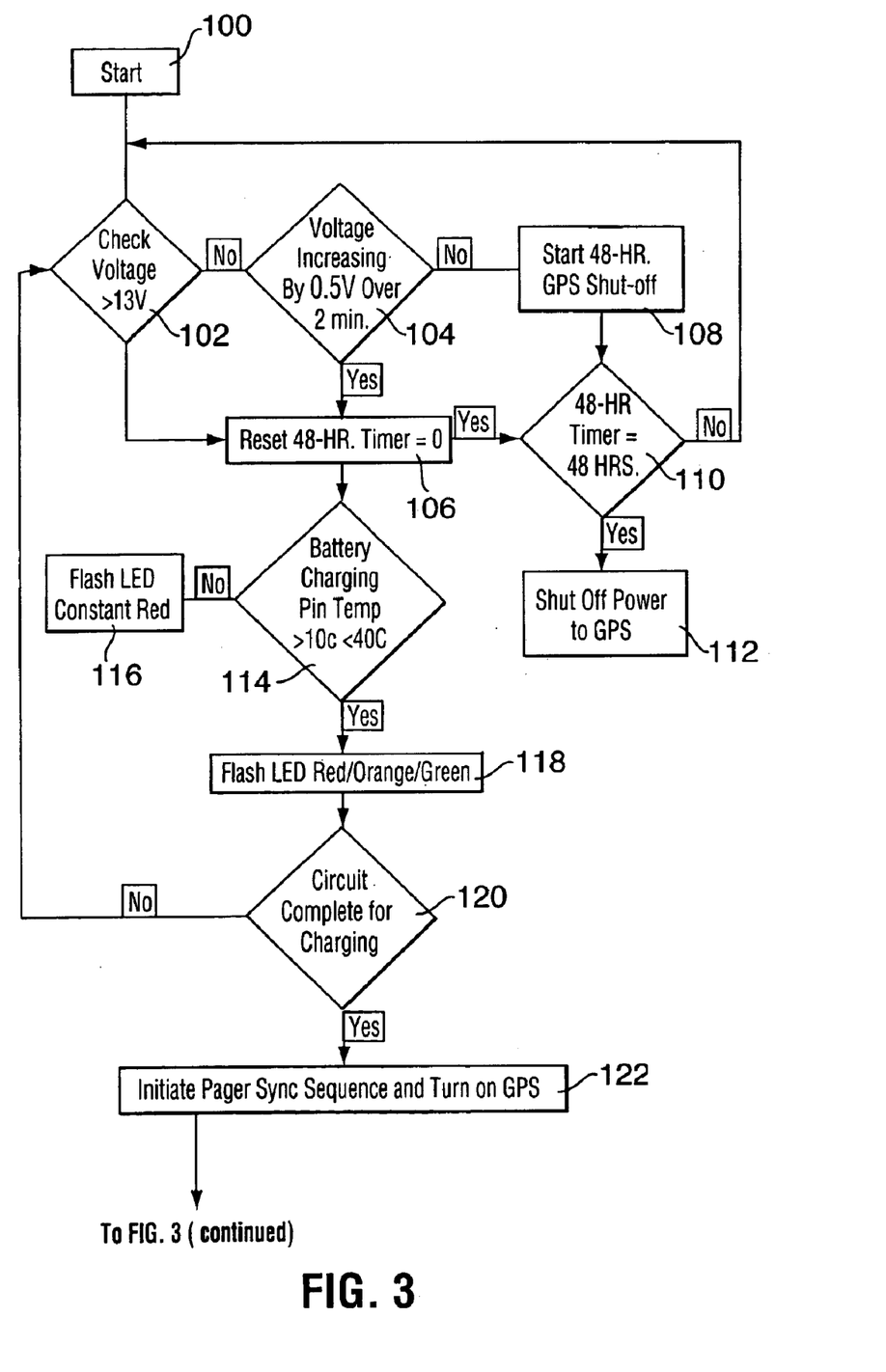
FIG. 3 is a decision flow chart showing timer decisions in respect of power delivery to a GPS peripheral device, and showing battery charging sequence for a rechargeable battery in a pager when in place in the cradle.

Reference will now be made to FIGS. 1 through 3.

First, having regard to FIGS. 1 and 2, an interactive pager docking system 10 is shown, including a pager 12 and a docking cradle 14. The pager 12, is shown being securely and physically held in place in the docking cradle 14.

The interactive two-way packet data pager 12 is essentially an off-the-shelf device. Typically, the pager may be such as a RIM™ 850 or 950 interactive pager, but any pager may be utilized provided that the physical characteristics and design of the docking cradle 14 are such as to accommodate the pager. In other words, if different pagers are used, it may be necessary to use a different docking cradle 14, having a somewhat different physical design.

The pager 12 is such as to be equipped generally with a QWERTY keyboard 16, and a display screen 18 on which incoming pager messages are displayed and on which outgoing messages or control commands are displayed as they are being typed using the QWERTY keyboard 16, before being transmitted or otherwise forwarded or stored for subsequent action. Needless to say, the pager 12 is equipped with a microprocessor (not shown), and it is such that is capable of executing a programmed application—whether that programmed application is pre-programmed into the pager's memory, or is one which is entered through the keyboard 16. Of course, the pager 12 is also capable of sending, receiving, sharing, and displaying alphanumeric data. The pager sends and receives alphanumeric data generally through its own antenna 20, and radio modem (not shown); and it will share alphanumeric data through a serial port indicated generally at 22. Alphanumeric data is, of course, displayed on the display panel 18. Alphanumeric data sent from and received by the interactive two-way packet data pager via its radio modem and antenna 20 are sent and received in packet data format.

The docking cradle 14 is shown having a cradle locking cover 24, which rocks or slides between a forward, locking position as shown in FIG. 1, and a rearward position which is limited by a stop 26 in the upper cover 28 of the docking cradle 14. Typically, when the cradle locking cover 24 is in its rearward position, the pager 12 is slipped into a receptacle which is defined at its sides by brackets 30. When in place, as shown, its serial port 22 communications through a docking communications ports 40 in the docking cradle 14, as discussed hereafter.

The pager 12 is powered by an internal battery (not shown); and, in this case, the battery is a rechargeable battery so that it may be recharged when it is placed in the docking cradle 14 and physically in place in the manner shown in FIG. 1. The structure of the interactive two-way packet data pager 12 is such that it is provided with a pair of externally connectible terminals 32, 34 associated with the rechargeable battery, so as to deliver charging power to the rechargeable battery.

As noted, the pager 12 has a communications port 22 whose purpose is to send and receive alphanumeric data and control signals to and from the docking cradle 14. Thus, not only can the pager function as a pager, whether it is in or out of the docking cradle, through its own radio modem and antenna, it will also communicate through its communications port 22 with the docking cradle 14 so as to send control signals to the docking cradle 14 or receive control signals from the docking cradle 14, and also so as to send and receive alphanumeric data such as pager data to and from the docking cradle 14 in circumstances as described hereafter.

The docking cradle 14 has a pair of charger terminals 36, 38 for physically connecting with the externally connectible terminals 32, 34 of the pager 12, when the pager is physically held in place in the docking cradle 14 such as is shown in FIG. 1. Likewise, the docking cradle 14 has a docking communications port 40, which connects to the communications port 22 of the pager 12, when the pager is physically held in place in the docking cradle 14.

The docking cradle 14 is connectible to an external source of power 42, which not only provides power for the docking cradle 14, but also for peripheral devices such as a GPS receiver and processor 44, as discussed hereafter. The external power source 42 also provides power so that charging power for the rechargeable battery in the pager may be delivered under the control of a battery charger module 46 in the docking cradle 14, when the pager 12 is physically held in place.

Typically, the external power source 42 is a source of 12 volt DC power, such as the electrical system of a vehicle. However, with appropriate transformers and power filters, etc., the external power source 42 could also be an ordinary source of alternating current, such as the nominal 100, 110, or 220 volt sources typically found in Asia, North America, and Europe.

Moreover, in general, the docking cradle 14 is provided with spring means, not shown, so as to provide a spring resistance against which the pager is physically held in place when it is placed into the docking cradle 14 in the manner shown in FIG. 1. This helps provide a shock-proof and vibration-proof connection between the terminals 32, 34 and mating terminals 36, 38 for the battery charger functions, and between the communications port 22 and the docking communications port 40. Accordingly, the interactive pager docking system of the present invention is adapted to function even when mounted in a moving vehicle which may, itself, be being driven over rough terrain.

Of course, the functions and operation of the docking cradle 14 are generally under the control of a central processor or control module 48, which provides operating and functional control, message and data buses, and memory functions and circuit hardware for the docking cradle 14.

Included among those functions are the requirement for communication between the docking cradle 14 and the pager 12, as well as with peripheral equipment, as described hereafter. Thus, communication between the pager 12 and the docking cradle 14 is carried out via a communications port 50; and between the docking cradle 14 and GPS receiver 44, communications are established through a port 52.

However, a purpose of the docking cradle 14 is to provide additional communications ports so as to permit external communications between the docking cradle 14 and additional peripheral or external devices—which may be a GPS receiver 44, as noted, a satellite transceiver 54, as discussed hereafter, or other external devices shown generally at 56. The other external serial devices shown generally at 56 may include printers, bar code scanners, or alarm annunciators. In any event, the docking cradle 14 includes a communication multiplexer 48 which is in series with the communications port 40, and its associated driver card 50, so as to provide additional serial communication through at least two further external communications ports 60, 62 and associated cards 64, 66, and thereby so as to provide connectibility to the external peripheral devices connected to the docking cradle 14. Indeed, as shown at 68, it is possible that the GPS receiver 44 may be connected through the port card 52 and multiplexer 58 to the docking cradle 14. Needless to say, any of the external peripheral devices which are connected through the ports 60, 62 to the docking cradle 14 are capable of exchanging data and control signals with the docking cradle 14, through the control module 48, and to the pager 12.

Typically, any of the communications ports of the docking cradle 14 are configured as RS-232 ports. However, there may be circumstances exist wherein it may be more appropriate for them to be configured as USB or Ethernet ports.

As noted, in general the communications ports are RS-232 ports. Moreover, typically the interactive pager docking system of the present invention includes the GPS receiver 44 which is physically placed apart from the docking cradle/pager arrangement as shown in FIG. 1, but which communicates with the docking cradle 14 through its own communications port 70 and associated card 52. However, as noted, it is possible that the GPS receiver 44 will communicate with the docking cradle 14 through the multiplexer 58.

As noted previously, and as will be discussed in greater detail hereafter, circumstances may sometimes exist when it is necessary for the interactive pager docking system of the pager docking system to be in communication with a satellite transceiver 54, in order that data may be sent from and received by the pager 12 via the docking cradle 14. Thus, the satellite transceiver and its associated satellite antenna 72 may be present in the interactive pager docking system of the present invention.

When the pager 12 is in communication through the docking cradle 14 with the GPS receiver 44, the satellite transceiver 54, or any of the other peripheral devices shown generally at 56, there may be the necessity for translation of data and control signals passing through the docking cradle 14. Thus, translation modules (not shown) are also provided in the control module 48 so as to provide the necessary data and control signal translation between and among the pager 12 and the external peripheral devices connected to the docking cradle 14.

Referring now specifically to FIG. 2, the general operating network in which the interactive pager docking system of the present invention may find itself is shown. No matter what the circumstances are in respect of which the interactive pager docking system of the present invention is being used, there will generally be a dispatch and AVL centre 74, which communicates through a terrestrial packet data network 76 to a plurality of pagers including the pager 12. The dispatch and AVL centre 74 may also communicate to a satellite hub 78 which, in turn, will uplink and downlink data through a communications satellite 80. In general, pager information will be sent to and received from the pager 12 and the dispatch and AVL centre 74 through the packet data network 76. However, it may happen that the vehicle, for example, in which the interactive pager docking system of the present invention is located, may be out of range of the packet data network 76. In that case, pager data may be sent from the dispatch and AVL centre via the satellite hub 78 and the satellite 80, to be received by the satellite transceiver 54 through its antenna 52. Moreover, it may be necessary to send data from the pager 12, even though it is out of range of the packet data network, in which case the data may be sent through the satellite transceiver 54 to the satellite 80, and thence through the satellite hub 78 to the dispatch and AVL centre 74.

A particular function of the general network arrangement of FIG. 2 is to provide the precise geographic location of a vehicle in which the interactive pager docking system of the present invention is mounted. This is accomplished by the GPS receiver 44, which receives Global Positioning System data signals through its antenna 82 so as to determine its precise geographic location as is well known with GPS receivers. Those data are transferred from the GPS receiver 44 to the docking cradle 14; and, thereafter, the data are generally transferred through the control module 48 to the pager 12 so as to be sent back through the packet data network 76 to the dispatch and AVL centre 74. Once again, however, the interactive pager docking system of the present invention provides additional routing through which the GPS data may be forwarded to the dispatch and AVL centre, because it is equipped with an appropriate multiplexer 58 to route that information via the satellite transceiver 54, as discussed above.

It is noted in FIG. 2 that the satellite transceiver 54 may also be provided with an additional input/output port and module 86, in the event that discrete data in respect of any particular circumstance are required to be transmitted via the satellite transceiver 54. The satellite transceiver 54 may also be equipped with a temperature sensor, as may the docking cradle 14.

The docking cradle 14 is equipped with a beeper 88, and a series of LED indicators shown generally at 90 in FIG. 2 and shown particularly at 92, 94, 96 in FIG. 1. Normally, the colors of the LED indicators 92, 94,96 are red, orange, and green, respectively. The purpose for the beeper 88 is generally to provide an audible signal to indicate that there is an incoming pager message being received by the interactive two-way packet data pager 12. One or more of the LED indicators 92, 94, 96 may also be illuminated in the event that there is an incoming message being received by the pager 12.

Especially when the interactive pager docking system of the present invention is mounted in a vehicle, and the external power source is a nominal 12 volt DC power source, there may be a provision for providing power to the GPS receiver 44 through a GPS power module 98 included in the docking cradle 14. Thus, as discussed in greater detail hereafter, the continuing provision of power to the GPS receiver may be under the control of the GPS power module 98 which, for those purposes, includes a timer (not shown).

As previously discussed, one of the principal functions of the docking cradle 14 in the interactive pager docking system of the present invention is to provide charging power to the rechargeable battery in the pager 12. In order to do so, there must be a pair of charger terminals in the docking cradle which will connect with the pair of externally connectible terminals on the pager. Those terminals may be provided in any convenient location on the pager; one particularly convenient location is for the charger terminals in the docking cradle to be physically located with the docking communications port, using two otherwise unused terminals therein. Generally, a docking communications port will comprise seven to nine terminals, but not all are used for sending and receiving data and control signals to and from the pager, timing signals, and so on. Indeed, it is possible that one of the pair of charger terminals 32, 34 and one of the at least two communications terminals which are required to provide communications between the docking cradle and the pager 12, may be a common terminal. That terminal is, of course, usually a system ground terminal.

It should be noted that the interactive pager docking system of the pager docking system, when mounted in a vehicle, may be powered through a cigarette lighter adapter, or it may be directly hardwired to a vehicle power source. It is important that power continue to be provided to the interactive pager docking system of the present invention, whether or not the vehicle is operating, and whether or not the ignition key is in an "ON" or "ACCESSORY" position.

When the cradle locking cover 24 is in its rearward position and the pager 12 is out of the docking cradle, such as in conditions when the vehicle operator has chosen to take the pager with him if he anticipates being away from the vehicle for an extended period of time, sensing means (not shown) which are in the docking cradle 14 will sense that the pager has been physically removed from the docking cradle. Typically, the LED display 92, 94, 96 will flash in a red, orange, green sequence, to indicate that the pager is out of its cradle. Then, when the driver returns to the vehicle and the pager is re-inserted into the docking cradle and the cradle locking cover 24 is pulled forward to physically lock the pager 12 in place, the flashing sequence of the LED indicators 90 will stop.

However, even before the pager is docked in the docking cradle 14, the control module 48 will cause a periodic sampling of the temperature at one of the charger terminals in the docking cradle to determine if the ambient temperature in which the interactive pager docking system of the present invention is operating, is within predetermined acceptable conditions. Usually, that means that a battery charging operation, as described in greater detail hereafter, will not occur if the ambient operating temperature where the interactive pager docking system is located is less than 10° C. or greater than 40° C. Typically, if the temperature conditions are outside the acceptable range, the red LED 92 will be continuously illuminated.

Moreover, because the interactive pager docking system is generally mounted in a vehicle, and includes the GPS receiver 44 which is constantly operating, there are conditions which exist where it is appropriate to turn off the GPS receiver. Specifically, if the vehicle is parked, and has been parked for more than 48 hours, especially in conditions where the pager is not in the cradle, then it is appropriate to shut down delivery of power from the vehicle battery to the GPS receiver. Thus, excessive discharge of the vehicle battery is precluded.

Referring specifically to FIG. 3, a logic flow is shown in respect of delivery of power to the GPS receiver and to the pager.

After a sequence start at 100, the vehicle voltage is checked, and a determination is made at 102 if the voltage is greater than 13 volts, or at 104 to determine if the voltage is increasing at a rate of 0.5 volts over two minutes. In either case, the timer—which is generally a 48 hour timer, as noted above—in the GPS power module 98 is re-set to zero at step 106. If the vehicle voltage is not over 13 volts and is not increasing by 0.5 volts over two minutes, then the timer sequence to shut off the GPS after 48 hours is started, as at step 108.

In either event, once the timer reaches 48 hours, as at step 110, the power is shut off to the GPS receiver, as at step 112. As noted, the GPS is typically continually operating, meaning that it will generally reacquire its updated position every second or so. Such GPS data acquisition is controlled from the docking cradle control module 48, under control of a RAM-contained set of instructions included in the docking cradle control module 48.

Typically, the docking cradle 14 is provided with a lithium battery (not shown) which has a very long life, so as to maintain power to the RAM in the control module 48, whether or not the docking cradle 14 is connected to an external source of power 42.

If the temperature sensor in the docking cradle 14 senses that the temperature at one of the charger terminals is less than 10° C. or greater than 40° C., as noted at step 114, then no further steps will be taken to provide charging power to the rechargeable battery in the pager 12, and the LED indicator 92—the red indicator—will be constantly illuminated at step 116.

On the other hand, if the ambient temperature within which the interactive pager docking system of the present invention is operating is within the predetermined temperature limits, then the flashing sequence red, orange, green of the LED display 92, 94, 96 will be initiated at step 118. A determination by sensing means (not shown) in the docking cradle 14 must be made to determine that the pager 12 is in place. This is shown at step 120. Once the pager is in place, then the sequence to initiate synchronization of the pager with the docking cradle is started, and the GPS receiver 44 is turned on, if it is not already on. This is shown at step 122.

Then, a determination is made at step 124 if the rechargeable battery in the pager 12 requires recharging or not. Assuming that the rechargeable battery in the pager is a NiCd or NiMH battery, then a determination is made as to whether or not the battery voltage is less than 1.275 volts. If the rechargeable battery in the pager is a rechargeable alkaline battery, then a slightly higher battery voltage determination will be made. In any event, if the battery voltage of the rechargeable battery in the pager is above predetermined limits, then the control module 48 will simply go into a stand-by mode as at step 126, awaiting control signals from the pager 12. Thus, the LED indicators 90 may be controlled as at step 128, the beeper 88 may be controlled as at step 130, and the various ports 40, 60, 62, and 70 to the pager, external serial devices, and the GPS receiver, will be controlled as required. This is shown at step 132; and the logic sequence ends at 134.

If the battery voltage of the rechargeable battery in the pager 12 is below the predetermined limit, then a determination is made at step 136 if the battery in the pager is also within predetermined temperature conditions. Thus, a determination is made as to whether suitable ambient temperature conditions exist for the battery per se, so as to enable safe battery charging. If appropriate temperature conditions for the rechargeable battery do not exist, then once again the LED indicator is constantly illuminated, and no further charging operation will continue as at step 138.

Otherwise, if the temperature conditions for the rechargeable battery in the pager 12 are appropriate, a charging cycle is initiated at step 140, and typically the green LED indicator 96 will be illuminated. Upon full charge of the battery having been obtained, at step 142, the LED 96 will be turned off, as at step 144.

Of course, the battery charger module 46 in the docking cradle 14 will also be such as to provide appropriate trickle charge, and to terminate or control delivery of charging power to the rechargeable battery, in keeping with its own preprogrammed battery charger operating conditions, all of which are outside the scope of the present invention but in keeping with the general principles surrounding the battery charging art. Moreover, it will be understood that the battery charger module 46 will also include appropriate timer means to discontinue the charging operation after a predetermined period of time. Such conditions may occur, for example, when the condition of the rechargeable battery in the pager 12 has deteriorated to such an extent that it will no longer accept charging power.

From all of the above, it will be seen that, when the interactive pager docking system includes the GPS receiver 44, and means are provided to determine whether the pager 12 is being physically held in place in the docking cradle 14, or not, then when it is determined that the pager 12 has not been physically held in place in the docking cradle 14 for a predetermined period of time, power will not be drawn from the vehicle battery by the GPS receiver 44.

There has been described an interactive pager docking system which is typically one that is mounted in a vehicle, but which may also be operated under other circumstances as well. It should be noted that sufficient RAM may exist in the docking cradle control module 48 to permit storage of messages intended for or being sent from the pager 12, in the event that the interactive pager docking system is outside of the range of the packet date network 76, and is either unequipped with or incapable of communicating through the satellite transceiver 54. Likewise, if the pager 12 is outside the range of the packet data network, it has been noted above that the dispatch and AVL centre 74 may communicate through the satellite hub 78, the satellite 80, and satellite transceiver 54 to the interactive pager docking system of the present invention; and, even if the pager 12 is not physically in place in the docking cradle 14, the RAM in the control module 48 may hold messages received via the satellite transceiver 54 until such time as the pager is replaced. At that time, messages will be relayed to the pager 12 from the docking cradle 14, for display on the display panel 18.

Specific examples have been discussed, not only with respect to operating voltages and times, and decision and logic sequences, but also even with respect to the display and illumination of status signals by a plurality of LED indicators. Of course, such discussion has been by way of example only, and it is evident that those of ordinary skill in the art may make other modifications and alterations in the design and manufacture of the apparatus of the present invention, without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, use of the terms "he", "him", or "his", is not intended to be specifically directed to persons of the masculine gender, and could easily be read as "she", "her", or "hers", respectively.

What is claimed is:

1. An interactive pager docking system for a pager, comprising an interactive two-way packet data pager and a docking cradle therefor;

wherein said interactive two-way packet data pager is a two-way wireless radio communicator having a microprocessor, and being capable of executing a programmed application, and also being capable of sending, receiving, sharing, and displaying alphanumeric data;

wherein said interactive two-way packet data pager is powered by a rechargeable battery, and has a pair of externally connectible battery terminals for delivering charging power to said rechargeable battery;

wherein said interactive two-way pager has a radio modem for sending and receiving alphanumeric data in packet data format;

wherein said interactive two-way pager has a communications port for sending and receiving alphanumeric data and control signals to and from said docking cradle;

wherein said docking cradle is adapted to physically hold said pager in place when said pager is inserted into said docking cradle;

wherein said docking cradle has a pair of battery charger terminals for connecting to said externally connectible battery terminals of said pager when said pager is being physically held in place in said docking cradle;

wherein said docking cradle has a docking communications port for connecting to said communications port of said pager when said pager is being physically held in place in said docking cradle;

wherein said docking cradle is connectible to a source of power, and is adapted to provide charging power to said rechargeable battery in said pager under the control of a battery charger module in said docking cradle, when said pager is being physically held in place in said docking cradle;

wherein said docking cradle includes a communication multiplexer in series with said communications port of said docking cradle and at least two further external communications ports in series with said multiplexer for connection to external peripheral devices capable of exchanging data and control signals with said docking cradle and said pager through said further communications port;

wherein said communications ports of said pager and in said docking cradle are RS-232 ports, and wherein said interactive pager docking system further comprises a GPS receiver in communication with said docking cradle through a communications port provided in said docking cradle therefor;

wherein sensing means are provided to determine the presence of said pager in said docking cradle, and wherein said docking cradle includes a power module to provide power to said GPS receiver; and wherein said power module includes a timer which acts to shut off power to said GPS receiver when said sensing means senses that said pager has not been in said docking cradle for a predetermined period of time.

2. The interactive pager docking system of claim 1, wherein said communications ports of said pager and in said docking cradle are chosen from the group consisting of RS-232, USB, and Ethernet ports.

3. The interactive pager docking system of claim 1, wherein said GPS receiver communicates with said docking cradle through one of said at least two further communications ports in series with said multiplexer.

4. The interactive pager docking system of claim 1, wherein said GPS receiver communicates with said docking cradle through a dedicated RS-232 port provided therefor.

5. The interactive pager docking system of claim 1, wherein said docking cradle includes spring means so as to provide a spring resistance against which said pager is physically held in place so as to maintain a shock-proof and vibration-proof connection between said externally connectable battery terminals of said pager and said pair of battery charger terminals of said docking cradle, and between said communications port of said pager and the said docking communications port of said docking cradle.

6. The interactive pager docking system of claim 1, wherein said external devices to which said docking cradle is connected through said at least two further external communications ports are chosen from the group consisting of GPS receivers, satellite transceivers, printers, bar code scanners, alarm annunciators, and combinations thereof.

7. The interactive pager docking system of claim 6, wherein data and control signal translation modules are included in said docking cradle so as to provide translation between and among said pager and the external peripheral devices connected to said docking cradle through said communications ports.

8. The interactive pager docking system of claim 1, wherein said interactive two-way packet data pager has a "QWERTY" keyboard for inputting alphanumeric data to said pager.

9. The interactive pager docking system of claim 1, wherein one of said further external communications ports in said docking cradle is connected to a satellite transceiver, so that data is sent from and received by said pager through said docking cradle.

10. The interactive pager docking system of claim 1, wherein said pair of battery charger terminals in said docking cradle is physically located with said docking communications port, and wherein there are at least two communications terminals provided for purposes of sending and receiving data and control signals to and from said pager.

11. The interactive pager docking system of claim 10, wherein one of said pair of battery charger terminals and one of said at least two communications terminals is a common terminal.

12. The interactive pager docking system of claim 1, wherein said battery charger module is adapted to detect the terminal voltage of said rechargeable battery in said pager, and to initiate a charging operation when predetermined terminal voltage conditions of said rechargeable battery exist.

13. The interactive pager docking system of claim 12, wherein said battery charger module further includes temperature sensing means to determine the internal temperature of said rechargeable battery, and to discontinue said charging operation when predetermined internal temperature conditions of said rechargeable battery exist.

14. The interactive pager docking system of claim 12, wherein said battery charger module further includes timer means to discontinue said charging operation after a predetermined period of time.

15. The interactive pager docking system of claim 1, wherein said docking cradle includes lamp means for indicating the status of a charging operation, under the control of said battery charger module; and for indicating the presence of incoming data to said pager, under the control of said microprocessor.

16. An interactive pager docking system for a pager, comprising an interactive two-way packet data pager and a docking cradle therefor;

wherein said interactive two-way packet data pager is a two-way wireless radio communicator having a microprocessor, and being capable of executing a programmed application, and also being capable of sending, receiving, sharing, and displaying alphanumeric data;

wherein said interactive two-way packet data pager is powered by a rechargeable battery, and has a pair of externally connectable battery terminals for delivering charging power to said rechargeable battery;

wherein said interactive two-way pager has a radio modem for sending and receiving alphanumeric data in packet data format;

wherein said interactive two-way pager has a communications port for sending and receiving alphanumeric data and control signals to and from said docking cradle;

wherein said docking cradle is adapted to physically hold said pager in place when said pager is inserted into said docking cradle;

wherein said docking cradle has a pair of battery charger terminals for connecting to said externally connectible battery terminals of said pager when said pager is being physically held in place in said docking cradle;

wherein said docking cradle has a docking communications port for connecting to said communications port of said pager when said pager is being physically held in place in said docking cradle;

wherein said docking cradle is connectible to a source of power, and is adapted to provide charging power to said rechargeable battery in said pager under the control of a battery charger module in said docking cradle, when said pager is being physically held in place in said docking cradle;

wherein said docking cradle includes a communication multiplexer in series with said communications port of said docking cradle and at least two further external communications ports in series with said multiplexer for connection to external peripheral devices capable of exchanging data and control signals with said docking cradle and said pager through said further communications port;

wherein said docking cradle is adapted to be connected to a source of 12 volts DC power, so as to be mounted in a vehicle;

wherein said interactive pager docking system further comprises a GPS receiver in communication with said docking cradle through a communications port provided therefor;

wherein sensing means are provided to determine the presence of said pager in said docking cradle, and wherein said docking cradle includes a power module to provide power to said GPS receiver; and wherein said power module includes a timer which acts to shut off power to said GPS receiver when said sensing means senses that said pager has not been in said docking cradle for a predetermined period of time;

whereby power is not drawn from a vehicle battery to which said interactive pager docking system is connected in the absence of said pager being inserted into said docking cradle after said predetermined period of time.

17. The interactive pager docking system of claim 16, wherein said GPS receiver communicates with said docking cradle through one of said at least two further communications ports in series with said multiplexer.

18. The interactive pager docking system of claim 16, wherein said GPS receiver communicates with said docking cradle through a dedicated RS-232 port provided therefor.

* * * * *